(12) United States Patent
Resetco et al.

(10) Patent No.: US 11,572,483 B2
(45) Date of Patent: Feb. 7, 2023

(54) AQUEOUS INK COMPOSITIONS FOR INKJET PRINTING ON NON-POROUS SUBSTRATES

(71) Applicant: Xerox Corporation, Norwalk, CT (US)

(72) Inventors: Cristina Resetco, Toronto (CA); Syed Ali, Milton (CA); Carla Brown, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 340 days.

(21) Appl. No.: 16/380,014

(22) Filed: Apr. 10, 2019

(65) Prior Publication Data
US 2020/0325352 A1    Oct. 15, 2020

(51) Int. Cl.

| | | |
|---|---|---|
| *C09D 11/38* | (2014.01) |
| *C09D 7/65* | (2018.01) |
| *C09D 7/63* | (2018.01) |
| *C09D 125/14* | (2006.01) |
| *C08L 29/04* | (2006.01) |
| *C08L 67/00* | (2006.01) |
| *C08L 71/02* | (2006.01) |

(Continued)

(52) U.S. Cl.
CPC ............... *C09D 11/38* (2013.01); *C09D 7/63* (2018.01); *C09D 7/65* (2018.01); *C09D 125/14* (2013.01); *C08L 29/04* (2013.01); *C08L 67/00* (2013.01); *C08L 71/02* (2013.01); *C08L 75/04* (2013.01); *C09D 171/00* (2013.01)

(58) Field of Classification Search
CPC . C09D 11/38; C09D 7/65; C09D 7/63; C09D 125/14; C09D 171/00; C09D 11/107; C09D 11/102; C09D 11/023; C09D 11/324; C09D 11/36; C08L 29/04; C08L 67/00; C08L 71/02; C08L 75/04; C08F 222/06; C08F 2800/10; C08F 8/30; C08F 8/44; C08F 8/32
See application file for complete search history.

(56) References Cited

U.S. PATENT DOCUMENTS 6,103,780 A * 8/2000 Matzinger ............ C09D 11/326
106/31.89
2004/0077749 A1* 4/2004 Yatake ................. C09D 11/322
523/160

(Continued)

FOREIGN PATENT DOCUMENTS

EP         0739959 A1    10/1996
JP      2018119027 A      8/2018
(Continued)

OTHER PUBLICATIONS

Richard J. Lewis, Sr. "Hawley's Condensed Chemical Dictionary, 12th Edition", John Wiley & Sons, Inc., New York pp. 1108-1109 (1993).*

(Continued)

*Primary Examiner* — Alexander C Kollias

(57) ABSTRACT

An aqueous ink composition for inkjet printing on non-porous substrates and a method for forming the same are disclosed. For example, the method includes preparing a primary polymer latex with an aromatic functional group, a hydrogen-bonding group, a flexible side-chain, and an ionic functional group and mixing the primary polymer latex with a secondary latex binder and one or more co-solvents.

10 Claims, 2 Drawing Sheets

(51) Int. Cl.
    *C08L 75/04*    (2006.01)
    *C09D 171/00*   (2006.01)

(56) References Cited

U.S. PATENT DOCUMENTS

| | | | | |
|---|---|---|---|---|
| 2006/0009589 A1* | 1/2006 | Haering | ............... | C08G 18/672 |
| | | | | 525/330.1 |
| 2008/0039598 A1* | 2/2008 | Kukula | ................. | C14C 11/003 |
| | | | | 526/65 |
| 2010/0015360 A1* | 1/2010 | Kyota | .................. | C09D 11/101 |
| | | | | 427/595 |
| 2011/0171386 A1 | 7/2011 | Ganapathiappan et al. | | |
| 2014/0352573 A1* | 12/2014 | Kasperchik | ............ | C09D 11/38 |
| | | | | 106/447 |
| 2018/0010003 A1 | 11/2018 | Vasudevan et al. | | |

FOREIGN PATENT DOCUMENTS

| | | |
|---|---|---|
| WO | 20100071646 A1 | 6/2010 |
| WO | 2016092309 A1 | 6/2016 |

OTHER PUBLICATIONS

Extended European Search Report for EP 20166902.5; dated Sep. 16, 2020; copy consists of 10 pages.
Office Action from Canadian Application No. 3,077,847, dated May 3, 2021, copy consists of 4 pages.

\* cited by examiner

AQUEOUS INK COMPOSITIONS FOR INKJET PRINTING ON NON-POROUS SUBSTRATES

The present disclosure relates generally to an ink composition and, more particularly, to an aqueous ink composition with components that have low toxicity for inkjet printing on non-porous substrates and methods for producing the same.

BACKGROUND

Digital printing, specifically inkjet printing of inks, can be done on porous paper substrates. The ink may dry and hold onto the porous paper substrates without smearing. Inks used in ink jet printing may have certain properties to allow the ink to be controlled and jetted through printheads used in ink jet printers. The ink jet printers may be digitally controlled to dispense or eject the ink from nozzles of the printheads.

Printing on non-porous substrates may be desirable as plastic films are used in packaging. For certain packaging, such as food packaging, the inks must have low toxicity to prevent potential health issues that can be caused by migration of ink components. However, inkjet inks that can be printed on non-porous substrates, such as UV-cured inks, have chemical components that can migrate from packaging into products and pose concerns for consumers. Alternatively, currently available aqueous inks with low toxicity cannot be effectively printed on non-porous substrates.

SUMMARY

According to aspects illustrated herein, there are provided an aqueous ink composition with low toxicity for inkjet printing on non-porous substrates and a method for forming the same. One disclosed feature of the embodiments is a method that comprises preparing a primary polymer latex with an aromatic functional group, a hydrogen-bonding group, a flexible side-chain, and an ionic functional group and mixing the primary polymer latex with a secondary latex binder and one or more co-solvents.

Another disclosed feature of the embodiments is a low toxicity aqueous ink composition on non-porous substrates. In one embodiment, the low toxicity aqueous ink composition comprises a functionalized low toxicity primary latex in 5-40 weight percent, a secondary latex binder in 5-20 weight percent, and one or more co-solvents. The functionalized low toxicity primary latex comprises an aromatic functional group, a hydrogen-bonding group, a flexible side-chain, and an ionic functional group. The low toxicity aqueous ink composition comprises a viscosity below 10 millipascal-seconds (mPa·s) at 25 degrees Celsius.

BRIEF DESCRIPTION OF THE DRAWINGS

The teaching of the present disclosure can be readily understood by considering the following detailed description in conjunction with the accompanying drawings, in which.

DETAILED DESCRIPTION

Figure 1:
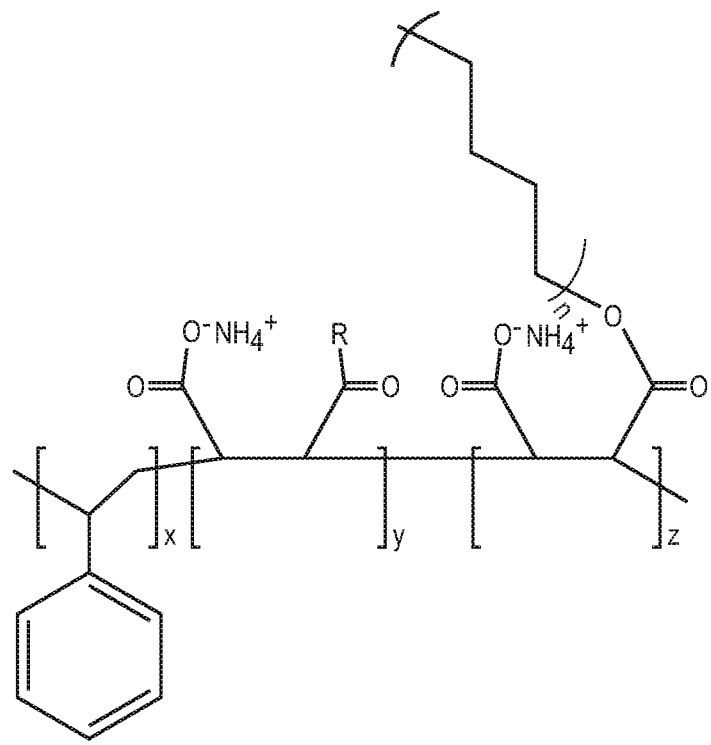
FIG. 1 illustrates an example structure of a functionalized latex of the present disclosure.

The present disclosure provides an aqueous ink composition containing components with low toxicity for inkjet printing on non-porous substrates and methods for producing the same. As discussed above, it may be desirable to use ink jet printing on a non-porous substrate, such as plastic. However, currently available inks used for ink jet printing contain potentially harmful chemical components or are not usable on non-porous substrates as the ink may smear or not adhere to the non-porous substrates.

The present disclosure provides an aqueous based ink composition that has a low toxicity. The aqueous based ink composition may be used to print on non-porous substrates, such as plastic packaging, used in food applications. In addition, the aqueous based ink composition has properties, such as low viscosity and desired particle sizes that allow the ink to be used in ink jet printheads or printers.

Embodiments of the present disclosure provide an aqueous ink composition that contains several latexes and/or binders that provide reinforcement of the ink on plastic substrates. As a result, these inks have good film formation on plastic substrates, good adhesion to plastic films, and are rub resistant.

In one embodiment, the low toxicity aqueous ink composition may include a low toxicity functionalized primary latex and a secondary latex or binder. The aqueous ink composition may be combined with one or more co-solvents and additives in a water based solution.

In one embodiment, the primary latex may be a low toxicity latex that can be used in non-porous or plastic packaging material that can have indirect food contact. An example of a low toxicity primary latex may include copolymers of polystyrene that is stabilized with ammonia having a particle size of 100-300 nanometers (nm). The low toxicity primary latex may be composed of a polymer that is on the list of Indirect Additives used in Food Contact Substances according to Code of Federal Regulations 175.330. An example polystyrene copolymer may include poly(maleic anhydride-co-styrene).

In addition, the primary latex may have low toxicity because the latex may be water-based and free from any catalysts or (photo)-initiators that are typically employed in ultraviolet (UV) cured inks. In addition, the overall aqueous ink composition may use co-solvents that have low toxicity (e.g., propylene glycols such as propylene glycol methyl ether, propylene glycol n-propyl ether, dipropylene glycol methyl ether).

The primary latex may be functionalized to have certain characteristics to allow the aqueous ink composition to be used in inkjet printers and to be printed onto non-porous substrates. The non-porous substrates may include plastic films including flexible and/or stretchable plastic films. The plastic types may include polyolefin materials that are ubiquitous in packaging, such as polyethylene terephthalate, polystyrene, polyethylene, and polypropylene. Other non-porous substrates may include metals (e.g., steel, aluminum, and the like) or glass.

In one embodiment, the primary latex may be functionalized or processed to contain four main chemical functionalities. For example, the primary latex may be mixed or chemically modified with different molecules that provide different chemical functionalities. The functionalities may include aromatic functional groups, hydrogen-bonding groups, flexible side-chains, and ionic functional groups. The aromatic functional group may be for film-forming. The aromatic functional groups may include styrenes, phthalates, pyrrolidones, and the like.

The hydrogen-bonding groups may provide mechanical reinforcement of the inks on the non-porous substrates. In other words, the hydrogen-bonding groups may help the aqueous based ink composition to be rub resistant when printed onto the non-porous substrates and provide good adhesion to the non-porous substrates.

The primary latex may be functionalized with molecules that contain strong hydrogen-bonding groups, such as hydroxyl, amine, and amide. The molecules may include amide functional groups coupled to cyclic and/or aromatic molecules. Example molecules may include urea, allantoin, tyramine, glucose, acryloyl glucofuranose (MAGP), N-[tris(hydroxymethyl)methyl]acrylamide, acrylamidophenylboronic acid, aminoethylmethacrylamide, acryloylmorpholine, acetoxyphenethyl acrylate and the like.

The flexible side-chains in the polymer latex may be incorporated for better compatibility with flexible substrates such as plastic films. Examples of the flexible side-chains may include alkyl containing molecules (e.g., butyl, hexyl, octyl, decyl, and the like, and associated isomers, such as iso-, sec-, or tert-alkyls). Examples of such alkyls may include isobutyl acrylate, (iso)-octyl acrylate, isodecyl acrylate, and the like).

The ionic functional groups in the polymer latex may impart stability of the polymer latex particles in aqueous solution and a low viscosity due to electrostatic repulsion between latex particles. For example, the viscosity of the functionalized primary latex at 30 weight percent (wt %) in water may be below 20 millipascal-seconds (mPa·s) at 25 degrees Celsius (° C.). In one example, the viscosity may be below 10 Cps at 25° C. Furthermore, the ionic functional groups in the primary latex may enable self-emulsification of the polymer without surfactants, which enhances the stability of the primary latex since typically used surfactants cannot be desorbed and/or destabilized.

The ionic functional groups may ensure that the primary latex remains stable in water and aqueous solutions. The ionic functional groups may prevent aggregation, flocculation, creaming, sedimentation, and/or precipitation in water.

In one embodiment, the ionic functional groups that can be incorporated into to the primary latex may include carboxylic acid, sulfonic acid and associated salts, such as ammonium. Additional examples of starting monomers with ionic functional groups may include acrylic acid, ethyl acrylic acid, methyl acrylic acid, methacrylic acid, sulfopropyl acrylate, [2-(acryloyloxy)ethyl]trimethylammonium chloride, and the like.

The different molecules for the different functionalities described above may be incorporated via nucleophilic addition of amine-containing molecules to poly(maleic anhydride-co-styrene). Examples of different aqueous ink compositions are described in further details below.

In one embodiment, the molecular weight of the functionalized primary latex may be between approximately 1,000 to 100,000 Daltons (Da). In one example, polymers with a lower weight (e.g., approximately 2,000 Da) may allow the latex to be more easily dispersed in water and form small particles (e.g., approximately 150-200 nm) with low polydispersity index (e.g., <0.2). On the other hand, polymers with a higher molecular weight may provide better mechanical properties due to greater chain entanglements.

In one embodiment, the content of each functional group in the polymer latex may range between 5-80 wt %. In one embodiment, the styrene content in the polymer latex may be at least 50 wt % or greater to achieve sufficient robustness and mechanical properties of the final aqueous ink compositions on substrates. In one embodiment, the content of the ionic monomer (e.g., the ionic functional group) in the polymer latex may be approximately 5-10 wt %. The content of the hydrogen bonding monomer (e.g., the hydrogen-bonding group in the polymer latex may be approximately 5-10 wt %).

In one embodiment, the secondary latex and/or binder may also have a strong hydrogen-bonding group. Examples of the secondary latexes may include polyurethane, polyamides, polyester, polyoxyethylene, poly(vinyl alcohol), poly(vinyl pyrrolidone), poly(ethylene glycol), hydroxyethyl cellulose, and the like, having a molecular weight of 30-100 kDa. In another embodiment, the secondary latex may be an acrylic copolymer resin with a molecular weight of approximately 200 kDa or higher. Examples of acrylic copolymer resin dispersions may include products known by the trade names such as Joncryl FLX 5201, Joncryl FLX 5100, Joncryl DFC 3040, and Joncryl ECO 2177.

In one embodiment, the aqueous ink composition may include 5-40 wt % of the functionalized primary latex and 5-20 wt % of the secondary latex or binder in terms of solids content in the ink. In one embodiment, the ratio of the secondary latex or binder to the functionalized primary latex may be between 5-100 wt %. In one embodiment, the ratio may be approximately 20 wt %.

As noted above, at a ratio of approximately 20 wt % of the secondary latex to the functionalized primary latex, a co-solvent system and additives may be added to provide good wetting and adhesion of the aqueous based ink composition on the non-porous substrate. In one embodiment, propylene glycols, such as propylene glycol methyl ether, propylene glycol n-propyl ether, and dipropylene glycol methyl ether, may be used. In one embodiment, the additives may include pH adjusters (e.g., triethanolamine), surfactants (e.g., Surfynol 420), or adhesion promoters (e.g., BYK 4500).

FIG. 1 illustrates an example chemical structure of the functionalized primary latex. For example, the functionalized primary latex may include "x" number of monomers of styrene as the aromatic functional group. The functionalized primary latex may include "y" number of hydrogen-bonding groups. The functionalized primary latex may include "z" number of carboxylic acid ammonium salt containing monomers to provide the ionic functional group. The functionalized primary latex may include "n" number of flexible side-chains.

Figure 2:
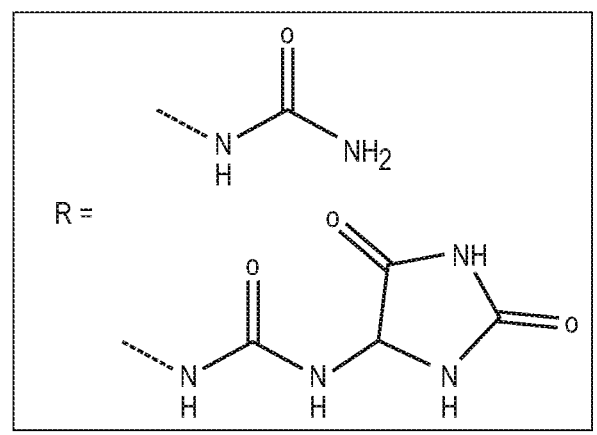
FIG. 2 illustrates an example functional group with strong hydrogen bonding of the present disclosure.

FIG. 2 illustrates different examples of the "R" group from FIG. 1. For example, the "R" group may be different hydroxyl and amide containing molecules such as urea or allantoin.

Figure 3:
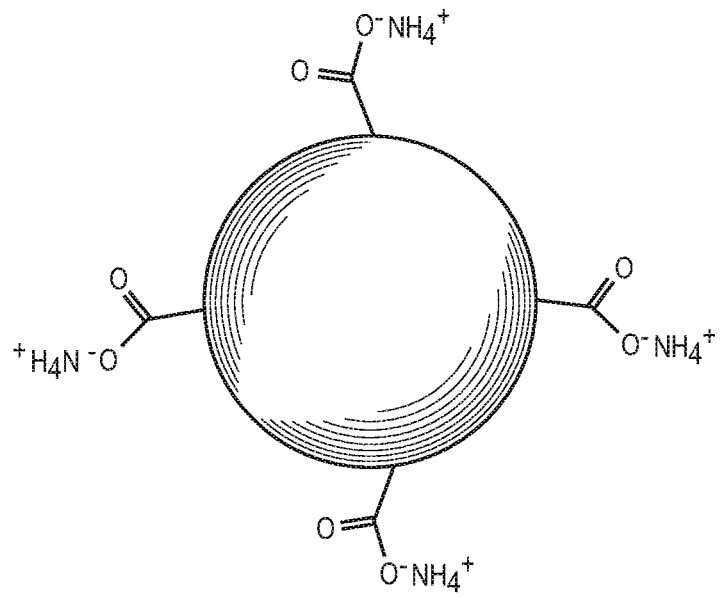
FIG. 3 illustrates an example of an ionically-stabilized surfactant-free latex of the present disclosure.

FIG. 3 illustrates an example of the latex particle that is created when the functionalized primary latex illustrated in FIG. 1 is dispersed in water. The latex particle may then be added to a water-based ink and used for ink jet printers that can be jetted through ink jet printheads.

Figure 4:
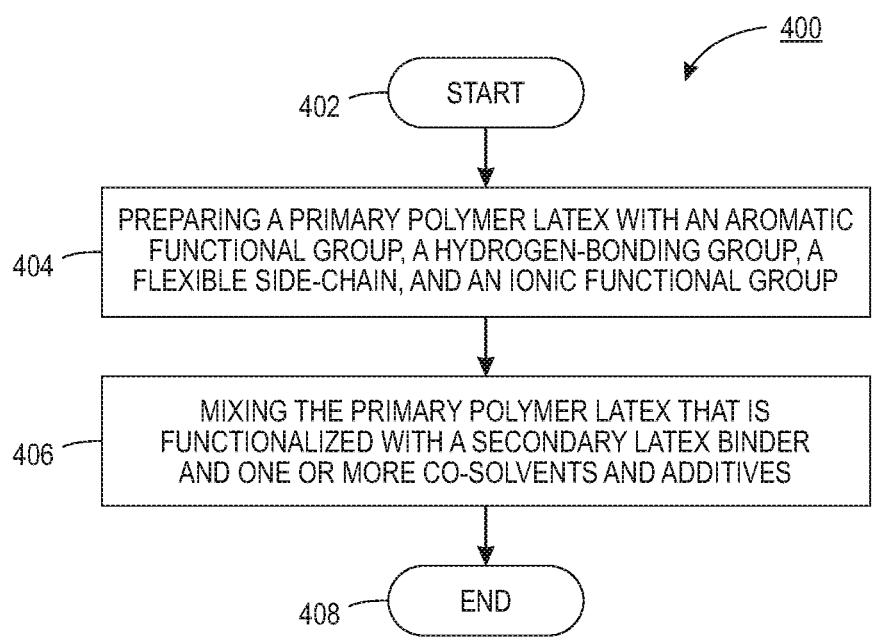
FIG. 4 illustrates a flowchart of an example method for forming an aqueous ink composition for inkjet printing on non-porous substrates of the present disclosure; and To facilitate understanding, identical reference numerals have been used, where possible, to designate identical elements that are common to the figures.

FIG. 4 illustrates a flowchart of an example method 400 for forming an aqueous ink composition with low toxicity for inkjet printing on non-porous substrates. At block 402, the method 400 begins. At block 404, the method 400 prepares a primary polymer latex with an aromatic functional group, a hydrogen-bonding group, a flexible side-chain, and an ionic functional group. As discussed, above, different molecules may be added to a low toxicity polymer to functionalize the polymer (e.g., poly(maleic anhydride-co-styrene)). Each functional group may provide a different function for the functionalized primary polymer latex that allows the aqueous ink composition to have a low viscosity with good wetting and adhesion to non-porous substrates and good rub-resistance that can be used for ink jet printers.

At block 406, the method 400 mixes the primary latex that is functionalized with a secondary latex binder and one or more co-solvents and additives. In one embodiment, the secondary latex binder and the one or more co-solvents and additives may be added to the functionalized primary latex and stirred.

In one embodiment, the combination of the functionalized primary latex, the secondary latex binder, and the one or more co-solvents may be added to an aqueous based ink. The ink may then be used to print on non-porous substrates using an ink jet printer. The ink may also provide low toxicity to allow the ink to be printed on plastic films used in the food industry. At block 408, the method 400 ends.

Below are examples of functionalized primary latexes that were prepared in accordance with the methods described above.

Example 1

Poly(styrene-alt-maleic anhydride), number average molecular weight ($M_n$) 2,300, 10 g in 50 milliliters (mL) acetone was modified with octylamine, 32 millimoles (mmol), 3.9 g by stirring the mixture at room temperature for 24 hours, resulting in poly(styrene-co-maleic anhydride-co-N-octyl maleamic acid). In order to introduce ionic functional groups into the polymer, 1.25 g of $NH_4OH$ (29 wt %) was added to the polymer solution and stirred for 30 minutes. To prepare the latex, the poly(styrene-co-maleic anhydride-co-N-octyl maleamic acid) solution in acetone was further diluted with 100 mL of acetone and heated to 50° C. The polymer solution in acetone was added dropwise to 75 mL of water at 60° C. under mechanical stirring. The latex was condensed to 30 wt % solids by evaporation of solvents by heating at 40° C. and stirring.

Example 2

Poly(styrene-alt-maleic anhydride), $M_n$ 2,300, 10 g in 50 mL acetone was modified with octylamine, 32 mmol, 3.9 g by stirring the mixture at room temperature for 24 hours. In order to introduce hydrogen-bonding allantoin functionality, 9.6 mmol, 1.5 g of allantoin was dissolved in dimethyl sulfoxide and added to the polymer solution and stirred at room temperature for 24 hours. The solvents were evaporated under reduced pressure and then the functionalized polymer was dissolved in 150 mL of acetone at 50° C. To prepare the latex, the polymer solution was further diluted with 100 mL of acetone and heated to 50° C. The polymer solution was added dropwise to 75 mL of water at 60° C. under mechanical stirring. The latex was condensed to 30 wt % solids by evaporation of solvents by heating at 40° C. and stirring.

Example 3

Poly(styrene-alt-maleic anhydride), $M_n$ 2,300, 10 g in 50 mL acetone was modified with octylamine, 32 mmol, 3.9 g by stirring the mixture at room temperature for 24 hours. In order to introduce hydrogen-bonding urea functionality, 9.6 mmol, 0.58 g of urea was dissolved in dimethyl sulfoxide and added to the polymer solution and stirred at room temperature for 24 hours. The solvents were evaporated under reduced pressure and then the functionalized polymer was dissolved in 150 mL of acetone at 50° C. To prepare the latex, the polymer solution was further diluted with 100 mL of acetone and heated to 50° C. The polymer solution was added dropwise to 75 mL of water at 60° C. under mechanical stirring. The latex was condensed to 30 wt % solids by evaporation of solvents by heating at 40° C. and stirring.

Properties of Functionalized Primary Latexes

The particle size of latexes and inks is low, in the range of 150-250 nm and remains unchanged when samples are stored at room temperature for approximately 1 month. This confirms that the ionic functionalities in the latex are effectively stabilizing the latex particles in water.

Particle Size

| Example # | Sample Description | Particle Size (nm), Zetasizer Nano | Poly-dispersity Index |
|---|---|---|---|
| 1 | poly(styrene-co-maleic anhydride-co-N-octyl maleamic acid latex | 240 | 0.12 |
| 2 | poly(styrene-co-maleic anhydride-co-N-octyl maleamic acid latex, allantoin functionalized | 133 | 0.10 |
| 3 | poly(styrene-co-maleic anhydride-co-N-octyl maleamic acid latex, urea functionalized | 162 | 0.13 |

The viscosity of the functionalized latexes at 30 wt % is low, which makes them amenable to a variety of printing processes, especially inkjet printing. The low viscosity of the latexes may be attributed to the low intermolecular interactions between particles due to strong electrostatic repulsion and stabilization by the ionic functional groups on the surface of the latex particles.

Viscosity of Functionalized Polymer Latexes

| Example # | Sample Description | Viscosity (mPa · s), 25° C., Shear rate 1 $s^{-1}$ | Viscosity (mPa · s), 25° C., Shear rate 400 $s^{-1}$ |
|---|---|---|---|
| 1 | poly(styrene-co-maleic anhydride-co-N-octyl maleamic acid latex | 2.85 | 2.55 |
| 2 | poly(styrene-co-maleic anhydride-co-N-octyl maleamic acid latex, allantoin functionalized | 12.48 | 5.98 |
| 3 | poly(styrene-co-maleic anhydride-Nco--octyl maleamic acid latex, urea functionalized | 4.21 | 4.17 |

Below are tables with examples of aqueous ink formulations containing functionalized primary latexes with different compositions of secondary latexes and co-solvent systems. Table 1 illustrated below after the examples, provides properties of the inks with the functionalized primary latexes including rub resistance and adhesion characteristics.

Example 4. Aqueous Ink with Functionalized Poly(Styrene-Co-Maleic Anhydride-Co-N-Octyl Maleamic Acid) Latex

| Component | Mass (g) | % Weight |
|---|---|---|
| poly(styrene-co-maleic anhydride-co-N-octyl maleamic acid) latex (30 wt. %) | 50 | 73.1 |
| Clariant Colanyl Black N500-MX | 3 | 4.4 |
| Dipropylene glycol methyl ether | 4 | 5.8 |
| Diethylene glycol ethyl ether | 4 | 5.8 |
| Triethylene glycol | 4 | 5.8 |
| Surfynol 420 | 0.2 | 0.3 |
| BYK4500 | 0.2 | 0.3 |
| Poly(vinyl alcohol-co-ethylene), ethylene 32 mol. % | 3 | 4.4 |
| Total | 68.4 | 100.0 |

Example 5. Aqueous Ink with Poly(Styrene-Co-Maleic Anhydride-Co-N-Octyl Maleamic Acid) Latex and Polyurethane Latex (Bayhydrol UH2606)

| Component | Mass (g) | % Weight |
|---|---|---|
| poly(styrene-co-maleic anhydride-co-N-octyl maleamic acid) latex (30 wt. %) | 40 | 58.3 |
| Clariant Colanyl Black N500-MX | 1.7 | 2.5 |
| Dipropylene glycol methyl ether | 4 | 5.8 |
| Diethylene glycol ethyl ether | 4 | 5.8 |
| Triethylene glycol | 4 | 5.8 |
| Surfynol 420 | 0.2 | 0.3 |
| BYK4500 | 1 | 1.5 |
| Bayhydrol UH2606 | 13.7 | 20.0 |
| Total | 68.6 | 100.0 |

Example 6. Aqueous Ink with Poly(Styrene-Co-Maleic Anhydride-Co-N-Octyl Maleamic Acid) Allantoin Functionalized Latex and Polyurethane Latex (Bayhydrol UH2606)

| Component | Mass (g) | % Weight |
|---|---|---|
| poly(styrene-co-maleic anhydride-co-N-octyl maleamic acid) allantoin functionalized latex (30 wt. %) | 40 | 58.3 |
| Clariant Colanyl Black N500-MX | 1.7 | 2.5 |
| Dipropylene glycol methyl ether | 4 | 5.8 |
| Diethylene glycol ethyl ether | 4 | 5.8 |
| Triethylene glycol | 4 | 5.8 |
| Surfynol 420 | 0.2 | 0.3 |
| BYK4500 | 1 | 1.5 |
| Bayhydrol UH2606 | 13.7 | 20.0 |
| Total | 68.6 | 100.0 |

Example 7. Comparative Ink without Functionalized Latex

| Component | Mass (g) | % Weight |
|---|---|---|
| Bayhydrol UH2606 | 50 | 76.0 |
| Clariant Colanyl Black N500-MX | 4 | 6.1 |
| Dipropylene glycol methyl ether | 3.8 | 5.8 |
| Diethylene glycol ethyl ether | 3.8 | 5.8 |
| Triethylene glycol | 3.8 | 5.8 |
| Surfynol 420 | 0.2 | 0.3 |
| BYK4500 | 0.2 | 0.3 |
| Total | 65.8 | 100.0 |

Example 8. Comparative Aqueous Ink with Joncryl FLX 5201 Latex

| Component | Mass (g) | % Weight |
|---|---|---|
| Joncryl FLX 5201 (40 wt. %) | 75 | 59.9 |
| Water | 25 | 20.0 |
| Clariant Colanyl Black N500-MX | 3 | 2.4 |
| Dipropylene glycol methyl ether | 7.3 | 5.8 |
| Diethylene glycol ethyl ether | 7.3 | 5.8 |
| Triethylene glycol | 7.3 | 5.8 |
| Surfynol 420 | 0.2 | 0.2 |
| BYK4500 | 0.2 | 0.2 |
| Total | 125.3 | 100.0 |

Example 9. Aqueous Ink with Joncryl FLX 5201 Latex and Poly(Styrene-Co-Maleic Anhydride-Co-N-Octyl Maleamic Acid) Latex

| Component | Mass (g) | % Weight |
|---|---|---|
| poly(styrene-co-maleic anhydride-co-N-octyl maleamic acid) latex (30 wt. %) | 90 | 46.4 |
| Clariant Colanyl Black N500-MX | 24 | 12.4 |
| Dipropylene glycol methyl ether | 11 | 5.7 |
| Diethylene glycol ethyl ether | 11 | 5.7 |
| Triethylene glycol | 11 | 5.7 |
| Surfynol 420 | 1 | 0.5 |
| BYK4500 | 1 | 0.5 |
| Joncryl FLX 5201 (40 wt. %) | 45 | 23.2 |
| Total | 194 | 100.0 |

Example 10. Aqueous Ink with Joncryl FLX 5201 Latex and Poly(Styrene-Co-Maleic Anhydride-Co-N-Octyl Maleamic Acid) Latex Functionalized with Urea

| Component | Mass (g) | % Weight |
|---|---|---|
| poly(styrene-co-maleic anhydride-co-N-octyl maleamic acid)-urea functionalized latex (30 wt. %) | 90 | 46.4 |
| Clariant Colanyl Black N500-MX | 24 | 12.4 |
| Dipropylene glycol methyl ether | 11 | 5.7 |
| Diethylene glycol ethyl ether | 11 | 5.7 |
| Triethylene glycol | 11 | 5.7 |

-continued

| Component | Mass (g) | % Weight |
|---|---|---|
| Surfynol 420 | 1 | 0.5 |
| BYK4500 | 1 | 0.5 |
| Joncryl FLX 5201 (40 wt. %) | 45 | 23.2 |
| Total | 194 | 100.0 |

Properties of Aqueous Inks with Functionalized Latexes on Plastic Films

TABLE 1

Properties of aqueous inks with different latex types on PET plastic films

| Example # | Polymer Latex | Additional Binder/Latex | Rub resistance (Kimwipe dry double-rubs) | Adhesion to PET, cross-hatch tape test |
|---|---|---|---|---|
| 4. | poly(styrene-co-maleic anhydride-co-N-octyl maleamic acid latex | Poly(vinyl alcohol-co-ethylene) | 70 | 2 |
| 5. | poly(styrene-co-maleic anhydride-co-N-octyl maleamic acid latex | Bayhydrol UH2606 | 70 | 3 |
| 6. | poly(styrene-co-maleic anhydride-co-N-octyl maleamic acid) allantoin functionalized latex | Bayhydrol UH2606 | 50 | 4 |
| 7. (comparative) | none | Bayhydrol UH2606 | 30 | 0 |
| 8. (comparative) | none | Joncryl FLX 5201 | 20 | 0 |
| 9. | poly(styrene-co-maleic anhydride-co-N-octyl maleamic acid) | Joncryl FLX 5201 | 30 | 3 |
| 10. | poly(styrene-co-maleic anhydride-co-N-octyl maleamic acid)-urea functionalized | Joncryl FLX 5201 | 70 | 4 |
| 11. (comparative) | poly(styrene-co-maleic anhydride-co-N-octyl maleamic acid latex | none | 10 | 3 |

The aqueous inks containing latexes were applied on untreated polyethylene terephthalate (PET) plastic films and dried at 60° C. The mechanical properties of the inks were evaluated by testing rub resistance via double rubs across the ink surface with a dry paper fiber optic wipe. The adhesion was tested by cross-hatch adhesion tape test with adhesive tape, using a scale of 0-5, where 0 indicates that all of the ink came off the substrate and 5 indicates that all of the ink remains on the substrate.

The functionalized latexes are particularly effective in combination with other binders and latexes that have strong hydrogen bonding, such as poly(vinyl alcohol-co-ethylene) and polyurethane latexes, such as Bayhydrol UH2606, Joncryl FLX 5201. Compared to the inks that contain only the polyurethane latexes, the addition of functionalized latexes significantly increases rub resistance up to 70 double rubs and adhesion to PET plastic films up to rating 4.

The comparative examples demonstrate the synergistic benefits of combining two types of latexes (e.g., the functionalized primary latex and the secondary latexes described above), as opposed to a single type of latex in the ink formulation. The enhancement in the properties of the inks prepared with two different latexes is expected to arise from strong hydrogen bonding that reinforces the polymer films. The single functionalized latex (Example 11) can be used to prepare inks and films on PET substrates; however, the mechanical properties are poor, especially low rub resistance. These latexes typically have low molecular weight (<10 kDa), which is not sufficient to form robust films. On the other hand, latexes with high molecular weight (>200 kDa), (Example 7 and Example 8) produce inks with better rub resistance but poor adhesion to the plastic PET substrate. Therefore, the combination of two latexes offers synergistic benefits in terms of good film formation, rub resistance, and adhesion to plastic (Examples 5, 6, 9, 10).

The viscosity of the aqueous inks is low, which makes them amenable to a variety of printing processes, especially inkjet printing. The low viscosity of the latexes can be attributed to the low intermolecular interactions between particles due to strong electrostatic repulsion and stabilization by the ionic functional groups on the surface of the latex particles.

Viscosity of Aqueous Inks

| Example # | Viscosity (mPa · s), 25° C., Shear rate 1 s$^{-1}$ | Viscosity (mPa · s), 25° C., Shear rate 400 s$^{-1}$ |
|---|---|---|
| 5 | 4.10 | 2.54 |
| 6 | 2.88 | 2.88 |

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. An aqueous ink composition for inkjet printing on non-porous substrates, comprising:
    a functionalized primary latex in 5-40 weight percent, wherein the functionalized primary latex comprises:
    an aromatic functional group;
    a hydrogen-bonding group to provide adhesion onto the non-porous substrates, wherein the non-porous substrates comprise polyolefin materials, wherein the hydrogen-bonding group comprises a molecule that includes a functional group coupled to a cyclic molecule or an aromatic molecule, wherein the molecule comprises at least one of: urea, allantoin, tyramine, glucose, acryloyl glucofuranose (MAGP), N-[tris(hydroxymethyl)methyl]acrylamide, acrylamidophenylboronic acid, aminoethylmethacrylamide, acryloylmorpholine, or acetoxyphenethyl acrylate;
    a flexible side-chain; and an ionic functional group to enable self-emulsification of the functionalized primary latex, wherein the ionic functional group comprises at least one of: carboxylic acid, sulfonic acid, or ammonium, wherein the aromatic functional group, the hydrogen-bonding group, the flexible side-chain, and the ionic functional group are added to poly(styrene-alt-maleic anhydride);

a secondary latex binder in 5-20 weight percent; and one or more co-solvents, wherein the aqueous ink composition comprises a viscosity below 10 millipascal-seconds (mPa s) at 25 degrees Celsius.

2. The aqueous ink composition of claim 1, wherein the secondary latex binder comprises at least one of: polyurethane, polyamide, polyester, polyoxyethylene, or polyvinyl alcohol.

3. The aqueous ink composition of claim 1, wherein the one or more co-solvents comprises a propylene glycol.

4. The aqueous ink composition of claim 3, wherein the propylene glycol comprises at least one of: propylene glycol methyl ether, propylene glycol n-propyl ether, or dipropylene glycol methyl ether.

5. The aqueous ink composition of claim 1, wherein the flexible side-chain comprises a branched alkyl having a side chain of at least one of: butyl, hexyl, octyl, or decyl.

6. A method for forming an aqueous ink composition for inkjet printing on non-porous substrates, comprising:

preparing a functionalized primary polymer latex with an aromatic functional group, a hydrogen-bonding group to provide adhesion onto the non-porous substrates, wherein the non-porous substrates comprise polyolefin materials, wherein the hydrogen-bonding group comprises a molecule that includes a functional group coupled to a cyclic molecule or an aromatic molecule, wherein the molecule comprises at least one of: urea, allantoin, tyramine, glucose, acryloyl glucofuranose (MAGP), N-[tris(hydroxymethyl)methyl]acrylamide, acrylamidophenylboronic acid, aminoethylmethacrylamide, acryloylmorpholine, or acetoxyphenethyl acrylate, a flexible side-chain, and an ionic functional group to enable self-emulsification of the functionalized primary latex, wherein the ionic functional group comprises at least one of: carboxylic acid, sulfonic acid, or ammonium, wherein the aromatic functional group, the hydrogen-bonding group, the flexible side-chain, and the ionic functional group are added to poly(styrene-alt-maleic anhydride), wherein the functionalized primary polymer latex that is prepared comprises 5-40 weight percent of solids in the aqueous ink composition; and mixing the functionalized primary polymer latex with a secondary latex binder and one or more co-solvents and additives to form the aqueous ink composition having a viscosity below 10 millipascal-seconds (mPa s) at 25 degrees Celsius, wherein the secondary latex binder comprises 5-20 weight percent of solids in the aqueous ink composition.

7. The method of claim 6, wherein preparing the functionalized primary polymer latex with the flexible side-chain, comprises:

chemically modifying the primary polymer latex with a branched alkyl having a side chain of at least one of: butyl, hexyl, octyl, or decyl.

8. The method of claim 1, wherein the secondary latex binder comprises at least one of: polyurethane, polyamide, polyester, polyoxyethylene, or polyvinyl alcohol.

9. The method of claim 1, wherein the one or more co-solvents comprises a propylene glycol.

10. The method of claim 9, wherein the propylene glycol comprises at least one of: propylene glycol methyl ether, propylene glycol n-propyl ether, or dipropylene glycol methyl ether.

* * * * *